United States Patent [19]

Arledge

[11] Patent Number: 4,574,520

[45] Date of Patent: Mar. 11, 1986

[54] GRAVITY FEED HYDROPONIC SYSTEM

[76] Inventor: James M. Arledge, 3100 Cypress St., West Monroe, La. 71291

[21] Appl. No.: 663,400

[22] Filed: Oct. 22, 1984

Related U.S. Application Data

[63] Continuation-in-part of Ser. No. 519,259, Sep. 21, 1983, abandoned, and Ser. No. 519,260, Oct. 24, 1983, abandoned.

[51] Int. Cl.⁴ ............................................. A01G 31/00
[52] U.S. Cl. ...................................................... 47/59
[58] Field of Search ................ 249/206; 239/499, 498, 239/524; 47/45, 62, 65, 64, 71, 59, 78, 63, 82, 83

[56] References Cited

U.S. PATENT DOCUMENTS

| 247,165 | 2/1878 | Hart | D11/2 |
|---|---|---|---|
| 1,112,558 | 10/1914 | Red | 248/129 |
| 1,453,401 | 5/1923 | Mattson | 137/862 |
| 1,556,275 | 10/1925 | Wilson | 248/94 |
| 1,752,597 | 4/1930 | Jackson | 47/83 |
| 1,830,769 | 11/1931 | Rothermel | 248/154 |
| 1,874,498 | 8/1932 | Glenny | 248/94 |
| 2,001,646 | 5/1935 | Abitsch | 248/41 |
| 2,003,986 | 6/1935 | Witthuhn | 47/39 |
| 2,732,954 | 1/1956 | Janonis et al. | 211/88 |
| 2,940,218 | 6/1960 | Carter | 47/1.2 |
| 3,264,783 | 8/1966 | Bayliss | 47/45 |
| 3,357,129 | 12/1967 | Torrence | 47/38 |
| 3,825,126 | 7/1974 | Pohl et al. | 211/71 |
| 3,882,634 | 5/1975 | Dedolph | 47/65 |
| 4,001,959 | 1/1977 | Grendahl | 40/152.1 |
| 4,025,012 | 5/1977 | Chan et al. | 248/163 |
| 4,025,435 | 5/1977 | Shea | 210/250 |
| 4,170,844 | 10/1979 | Steele | 47/62 |
| 4,177,604 | 12/1979 | Friesen | 47/62 |
| 4,216,617 | 8/1980 | Schmidt | 47/62 |
| 4,218,847 | 8/1980 | Leroux | 47/59 |
| 4,231,189 | 11/1980 | Hochberg | 47/83 |
| 4,434,577 | 3/1984 | Holtkamp | 47/71 X |
| 4,454,684 | 6/1984 | O'Hare | 47/82 |

FOREIGN PATENT DOCUMENTS

| 101720 | 8/1965 | Denmark | 47/78 |
|---|---|---|---|
| 2748010 | 4/1978 | Fed. Rep. of Germany | 47/59 |
| 1560632 | 3/1969 | France | 47/63 |
| 2461449 | 3/1981 | France | 47/57 |
| 7506942 | 12/1976 | Netherlands | 47/64 |
| 23651 | of 1908 | United Kingdom | 239/498 |

Primary Examiner—Robert A. Hafer
Assistant Examiner—Danton DeMille
Attorney, Agent, or Firm—Bernard, Rothwell & Brown

[57] ABSTRACT

A system for hydroponically growing plants in a vertical array includes a vertical cylindrical column adapted to contain an inert support material, the column including top and bottom openings and a plurality of side apertures. A nutrient reservoir is provided for positioning above the column and adapted to contain a nutrient solution. The introduction of nutrient solution into the column is controlled by an adjustable valve supported above the top opening of the column for gravity feed of nutrient solution into the column. The valve is positioned to permit visual inspection of the rate of introduction of nutrient solution through the valve and into the column. A conduit connects the valve to the nutrient reservoir.

20 Claims, 10 Drawing Figures

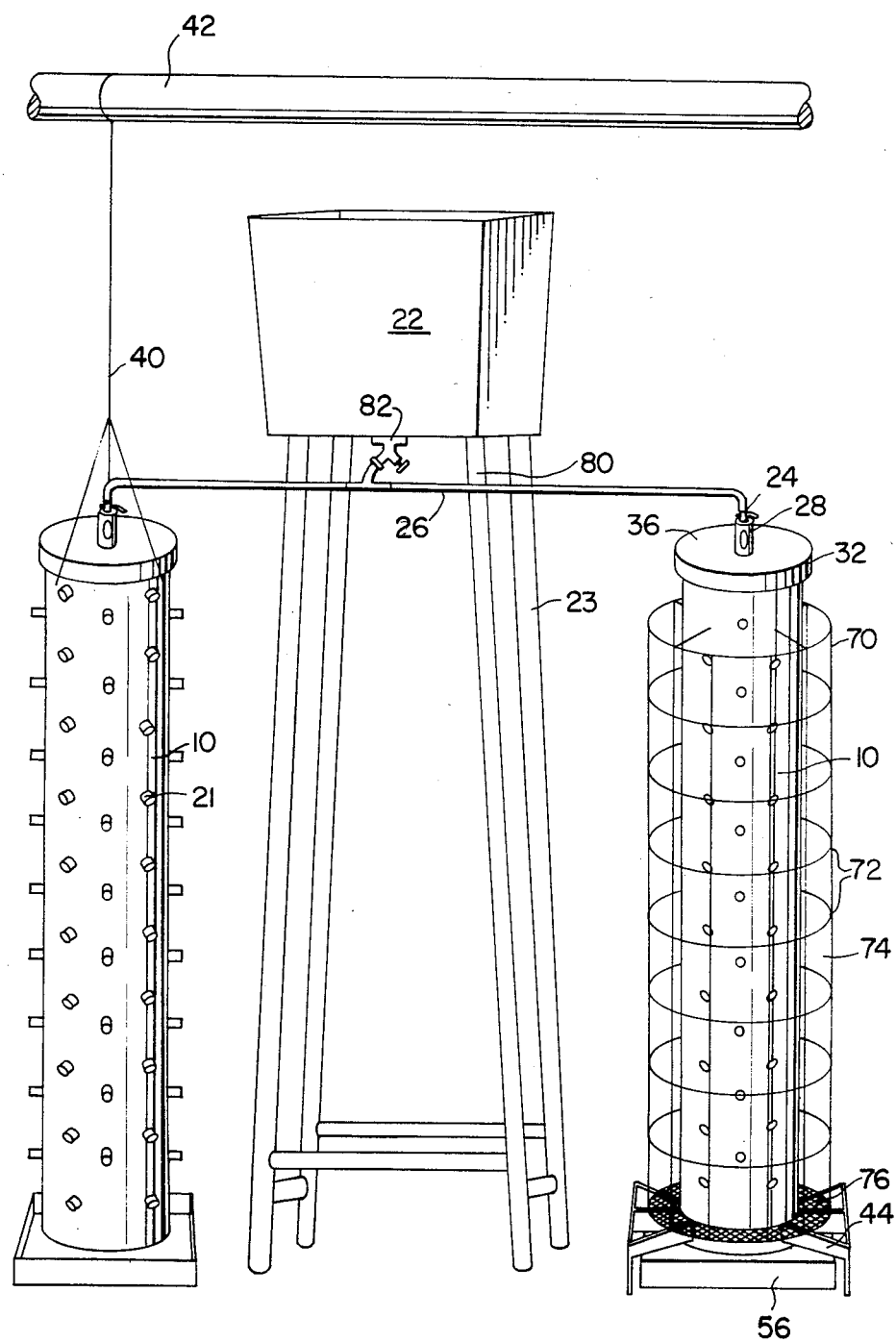

GRAVITY FEED HYDROPONIC SYSTEM

BACKGROUND OF THE INVENTION

Cross-Reference to Related Applications

This application is a continuation-in-part of copending prior applications Ser. No. 519,259, filed Sept. 21, 1983 abandoned and Ser. No. 519,260, filed Oct. 24, 1983 abandoned.

Field of the Invention

The present invention relates to a hydroponic system for growing plants in vertical pipes.

Description of the Background Art

The use of columns for growing plants in a vertical array is well known in the art. Generally, the columns are cylindrical and contain a substrate material for root support. A plurality of side holes or apertures are provided in the columns through which plants grow from the substrate material, the branches of the plants extending outwardly from the columns.

The substrate material may contain nutrients as disclosed in U.S. Pat. No. 4,231,189. However, depletion of the nutrient supply requires replacement of the substrate and/or addition of fresh nutrients, e.g., by addition of fertilizer.

The use of vertical columns in hydroponic systems is also known. See U.S. Pat. No. 4,454,684. In a hydroponic system, the substrate material in the column is generally inert, and nutrients in solution are added to the substrate material.

Water and/or nutrient solution is generally introduced into the substrate material at the top of the column. The fluid moves generally downwardly through the column and excess fluid drains out of the column through a column bottom opening. The drainage fluid may then be discarded, or recycled through the column by means which may include, for example, a pump.

Because the drainage fluid may contain valuable nutrients, it is wasteful and relatively more expensive to discard drainage fluid than to recycle it. On the other hand, recycling fluid increases the risk of disease development, and contamination of the entire nutrient supply as well as the substrate material in the column and all the plants growing therein.

There thus remains a need in the art for a hydroponic system which minimizes the waste of nutrient solution without requiring recirculation of drainage liquid.

SUMMARY OF THE INVENTION

In accordance with the present invention, a system for hydroponically growing plants in a vertical array comprises a vertical cylindrical column adapted to contain an inert support material, the column including top and bottom openings and a plurality of side apertures. A nutrient reservoir is provided for positioning above the column, the nutrient reservoir being adapted to contain a nutrient solution. Means are provided for controlling introduction of nutrient solution into the column, the means including an adjustable valve for controlling the rate of introduction of nutrient solution into the column, and means for supporting the valve above the top opening of the column for gravity feed of nutrient solution into the column. The means provided for supporting the valve permit visual inspection of the rate of introduction of nutrient solution through the valve and into the column. Conduit means are provided for connecting the valve to the nutrient reservoir.

The invention also provides a method for hydroponically growing plants which comprises growing plants in a vertical array, one above the other, in a column of root support material, the branches of the plants extending outwardly from the column through apertures in a column wall containing the root support material, the column wall having top and bottom openings. Nutrient solution is introducted into the root support material by continuously dripping nutrient solution through the top opening of the column. The rate of introduction of nutrient solution into the root support material is controlled by adjusting the flow of nutrient solution to maintain substantially all of the root support material in a moist condition without substantial drainage of nutrient solution from the column through the bottom opening of the column wall.

BRIEF DESCRIPTION OF THE DRAWINGS

FIG. 3 is a perspective view, partially schematic, of a hydroponic system according to the invention showing different column embodiments.

DESCRIPTION OF THE PREFERRED EMBODIMENT

Figure 1:
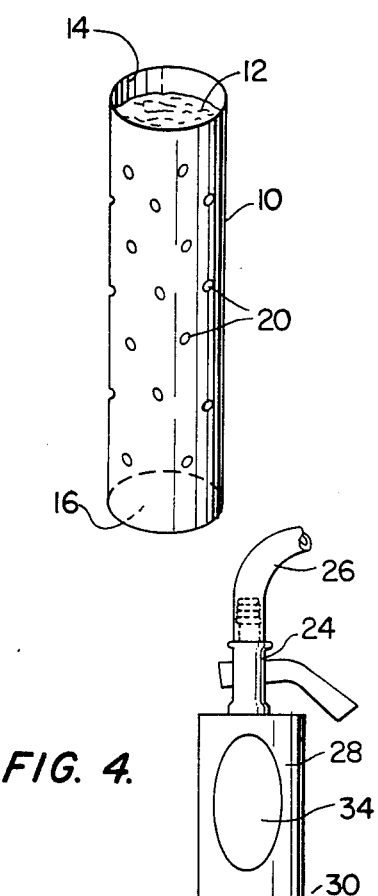
FIG. 1 is an elevational view of a column for use with a system according to the invention showing the top opening of the column.
Figure 2:
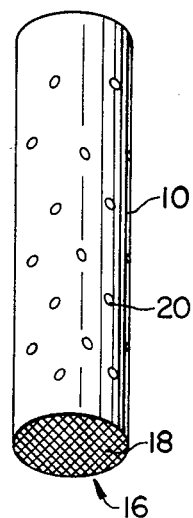
FIG. 2 is an elevational view of the column of FIG. 1, showing the screened bottom opening of the column.

With reference to FIGS. 1 and 2, a hydroponic system according to the invention includes a vertical cylindrical column 10 adapted to contain an inert support material 12. The column includes a top opening 14 through which nutrient solution may be introduced into the inert support material 12, and a bottom opening 16 which permits excess nutrient solution to drain from the column. The bottom opening 16 is preferably covered by a porous mesh screen material 18 having pores which are sufficiently large to permit fluid passage therethrough, yet sufficiently small to prevent the support material from passing out of the column through bottom opening 16.

The support material is preferably inert and may be comprised of various granular and fibrous materials as is known in the art. The support material may include porous plastic meshes or particles of, for example, styrofoam or polyurethane, and/or may include such inert materials as nylon filaments, perlite and fiberglass filaments.

The column 10 includes a plurality of side apertures 20 through which plants may grow. The purpose of the support material is to support seeds in the vicinity of an aperture 20 during germination, to support the roots of plants growing through the apertures 20, and to provide a means for delivering fluid and nutrients to seedlings and to the roots of growing plants.

A nutrient reservoir 22 is provided for positioning above the column 10. See FIG. 3. The nutrient reservoir 22 is adapted to contain a nutrient solution, e.g., water and conventional plant foods. The reservoir 22 may be supported at a higher elevation than the top of colum 10 by any suitable means such as legs 23.

Means are also provided for controlling the introduction of nutrient solution into the column 10 from the nutrient reservoir 22. These means include an adjustable valve 24 which is connected to the nutrient reservoir 22 by conduit means 26.

Figure 4:
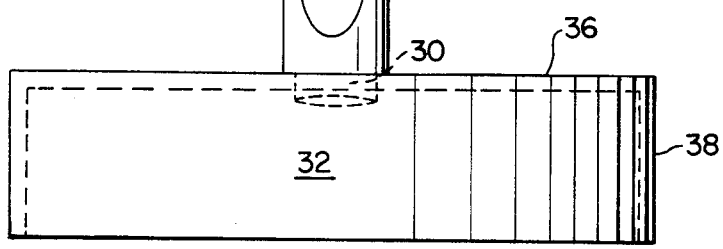
FIG. 4 is a detailed perspective view of a cap and valve assembly for a hydroponic system according to the invention.
Figure 5:
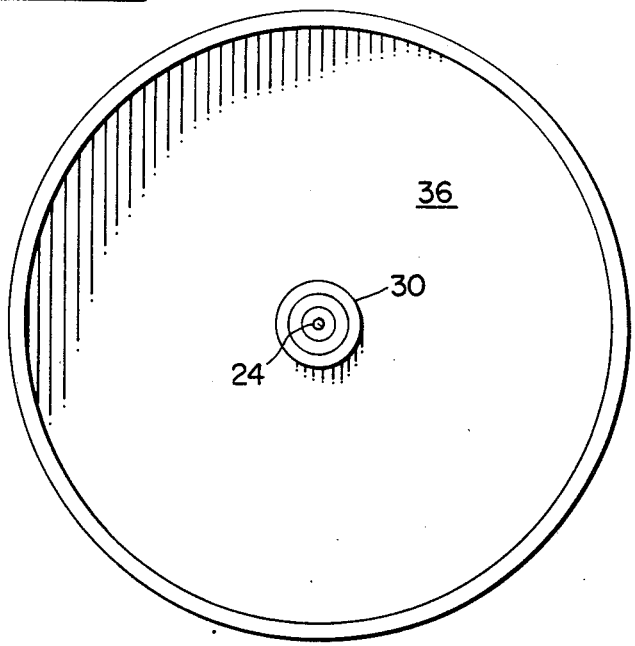
FIG. 5 is an elevational view of the underside of the cap and valve assembly shown in FIG. 4.

Means are provided for supporting valve 24 above the top opening of the column 10 for gravity feed of nutrient solution into the column. See FIGS. 3, 4 and 5. These means include a hollow pipe 28 having a top opening which mates with valve 24 and hollow bottom portion 30 adapted to mate with a corresponding, generally centrally located opening in a column cap 32. Hollow pipe 28 is adapted to permit unrestricted flow of liquid therethrough from valve 24. Pipe 28 also includes means such as window 34 for permitting visual inspection of the rate of fluid flow from valve 24 through pipe 28.

Valve 24 is preferably adjustable to control regularly timed drips of nutrient solution into column 10.

Cap 32 includes a disc-shaped top portion 36 and a rim portion 38 attached to and extending downwardly from the periphery of the top portion 36. The rim and top portions of cap 32 are adapted to mate with and cover the top opening of column 10. This arrangement permits nutrient solution to flow into column 10 from the nutrient reservoir 22 through conduit 26, valve 24 and hollow pipe 28, with visual inspection of the rate of flow through window 34. Cap 32 also serves to restrict evaporation of nutrient solution through top opening 14 of column 10.

Column 10 may be supported in a vertical position by any suitable means, such as cable 40 connecting column 10 to support member 42 as shown in FIG. 3. Alternatively, and preferably, column 10 is supported in a vertical position by means of a column base 44.

Figure 7:
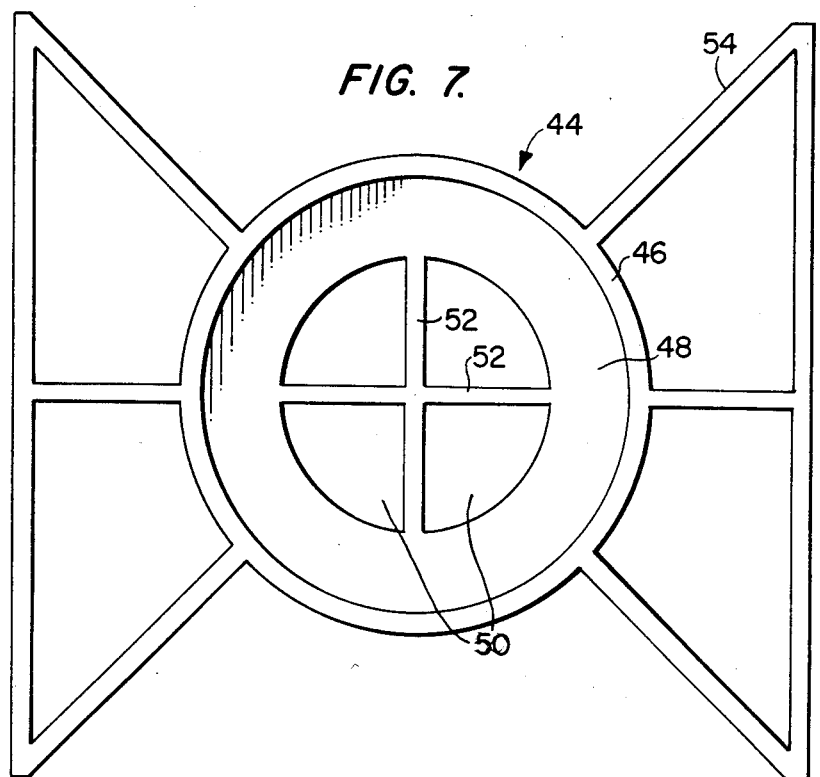
FIG. 7 is a top plan view of a column base for use with a system according to the invention.
Figure 8:
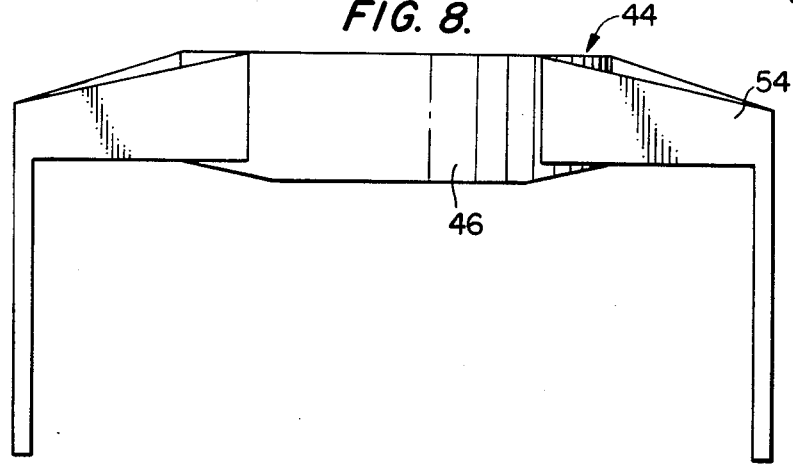
FIG. 8 is a side elevational view of the column base shown in FIG. 7.

Base 44 preferably includes a vertical cylindrical rim 46 having an inner diameter sized to complementarily fit around the outside of and mate with a bottom portion of column 10. See FIGS. 3, 7 and 8. A bearing means, such as bearing platform 48, is connected by any suitable means to and supported by the rim 46, and protrudes inwardly from a bottom portion of rim 46. The bearing platform 48 is adapted to rest against and support column 10 when the bottom portion of column 10 is in mating position with rim 46. The bearing platform 48 has apertures 50 therein which permit drainage of excess nutrient solution from column 10. The bearing platform 48 may also include cross members 52 which provide support for the screen-like mesh 18 at the bottom of column 10. Rim support means 54, in the form of legs, are attached by any suitable means to the outer surface of rim 46 and extend outwardly and downwardly from rim 46 to support the cylindrical rim 46, and column 10 mating therewith, in a vertical position above a surface.

Base 44 may be formed as a single unit, e.g., molded plastic.

According to one embodiment, means are provided for collecting nutrient solution draining from column 10 through the bottom opening 16 in the column. This means may include a collection reservoir 56 adapted to fit beneath the bottom opening 16 of column 10. According to a preferred embodiment, legs 54 of column support base 44 extend first outwardly and then downwardly from rim 46 thereby providing space for collection reservoir 56 beneath rim 46 and bearing platform 48. See FIGS. 3, 7 and 8. The collection reservoir 56 and legs 54 are adapted to permit access to the collection reservoir and removal of the collection reservoir from a position beneath the bottom opening of the column to a position away from the base without changing the position of column 10 and base 44 relative to a surface on which they are supported.

Figure 9:
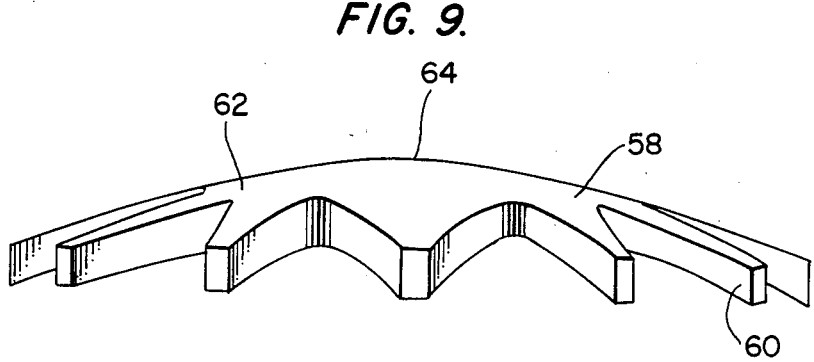
FIG. 9 is a perspective view of a dispersion baffle for use with a system according to the invention.
Figure 10:
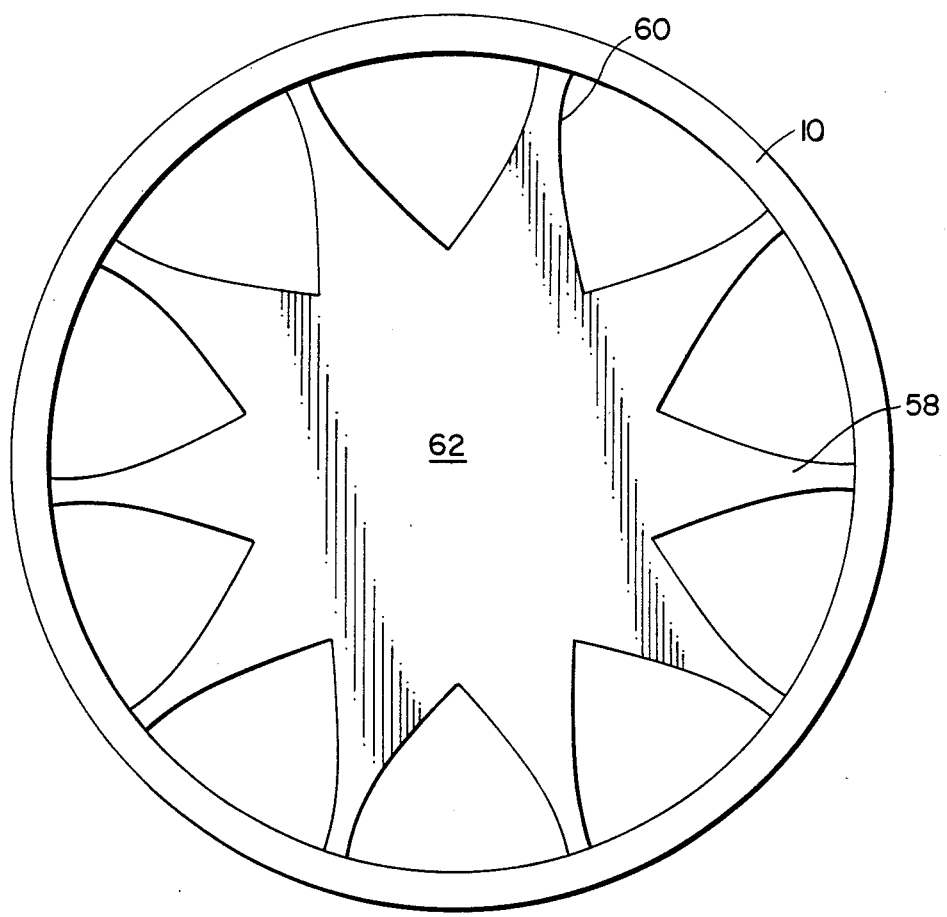
FIG. 10 is a top plan view of the dispersion baffle shown in FIG. 9, placed in a column according to the invention.

When using a column having a diameter of 6 inches or more according to the invention, the system preferably includes a nutrient solution dispersion baffle 58, although baffle 58 may be used with smaller diameter columns. See FIGS. 9 and 10. Baffle 58 comprises a serrated disc of generally impervious material, the disc having an outer perimeter sized to fit complementarily within the top opening 14 of column 10. Disc 58 is adapted to rest over the inert support material 12 and below valve 24. The serrations 60 are generally evenly disposed about the outer periphery of disc 58.

The upper surface 62 of disc 58 has a raised central portion 64 and extends generally downwardly and outwardly from the raised central portion to the periphery of disc 58. Valve 24 is positioned over the raised central portion 64 of disc 58 so that nutrient solution falls onto raised central portion 64 and flows over the upper surface portion 62 towards the periphery of the disc. Upon reaching the serrations 60, nutrient solution passes to the inert support material 12. The upper surface 62 of disc 58 and the serrations 60 are thus adapted to disperse nutrient solution towards the inert support material adjacent the inside surface of column 10. The nutrient solution dispersion baffle 58 provides a generally even distribution of nutrient solution to the inert support material 12 in the column.

Figure 6:
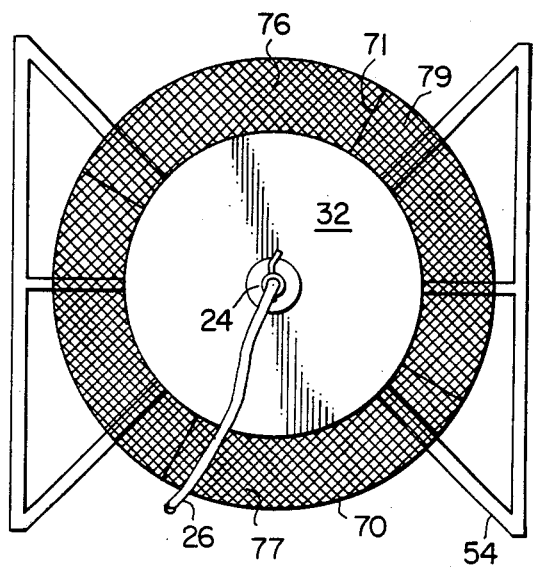
FIG. 6 is a top plan view with portions broken away of a hydroponic system according to the invention.

A plant support cage 70 may be provided to support heavily laddened woody-stemmed plants, and/or to confine plant growth to a limited area. See FIGS. 3 and 6. Support cage 70 includes a plurality of cross-linked members 72 which define a plurality of apertures 74. Support cage 70 is in the general shape of a vertical cylinder having a diameter substantially larger than the cylindrical column 10, and a vertical length about equal to the vertical length of column 10. Support cage 70 is adapted to be positioned outside column 10 and generally concentrically therewith. The upper edge of the cylindrical support cage 70 may be connected to an upper portion of column 10 by horizontal support member 71.

The cross-linked members 72 are sufficiently slender relative to apertures 74 so as to permit substantially unrestricted light to contact plants growing from the column. Apertures 74 are preferably large enough to permit removal of fruits and vegetables from the plants. Aperture diameters of, for example, from about 3 to about 6 inches are generally suitable, depending on the size of fruit or vegetable.

Support cage 70 may be supported in a vertical position by any suitable means, such as by resting on legs 54 of column support 44. The bottom edge of support cage 70 is preferably connected to a substantially horizontal bottom cage member 76. Bottom cage member 76 comprises a plurality of cross-linked members 77 defining a plurality of apertures 79. The horizontal bottom member 76 is connected to the bottom edge of the cylindrical support cage by any suitable means and extends from the bottom edge of the support cage inwardly to a position adjacent cylindrical column 10.

In a preferred embodiment, the apertures of the bottom member 76 are substantially smaller than the apertures 74 of cage 70, e.g., sufficiently small to catch and hold fruits and vegetables which fall from plants growing from column 10.

In another embodiment, each aperture 20 of column 10 is fitted with a short length of hollow support pipe 21 having an outer diameter sized to fit complementarily within and mate with apertures 20. See FIG. 3. The hollow support pipes 21 are mounted horizontally within apertures 20, extending a short distance (e.g., ¼ inch) within column 10 and a greater distance (e.g., 2 inches) outside of column 10. The pipes 21 provide support for the stems of plants growing through the support pipes from column 10. Support pipes 21 may also be utilized in conjunction with support cage 70.

According to one embodiment, the system includes a plurality of columns 10, each column including its own conduit 26, valve 24, pipe 28 and cap 32. According to this embodiment, each column is fed through an individual conduit 26, the individual conduits 26 being connected to a single nutrient reservoir 22, e.g., by means of distribution manifold 80. See FIG. 3. Distribution manifold 80 may contain any desired number of outlets, depending on the number of columns 10 which are supplied by nutrient reservoir 22. The individual outlets of the distribution manifold 80 may each have a valve (not shown) controlling nutrient flow to the conduits.

Fluid passage from nutrient reservoir 22 to the distribution manifold 80 is preferably controlled by a common valve 82 which regulates the flow of nutrient solution to conduits 26.

According to the method of the invention, plants are grown hydroponically in a column by controlling the rate of continuous introduction of nutrient solution into the root support material. Saturation of the inert support material 12 may generally be achieved by adjusting valve 24 so that nutrient solution drips from the valve. The drip rate may be adjusted by valve 24 to regulate the amount of nutrient solution entering column 10.

Drip window 34 permits timing of the drips, and thus provides an accurate means for measuring the rate of nutrient flow into the column. The rate of introduction of nutrient solution into the root support material is controlled by adjusting the flow of nutrient solution to maintain substantially all of the root support material in a moist condition without substantial drainage of nutrient solution from the column 10 through the bottom opening 16. This is accomplished by opening valve 24 to a position wherein nutrient solution drips into the column at a rate sufficient to saturate the inert support material 12 and to cause excess nutrient solution to drain from column 10 through bottom opening 16. Valve 24 is then adjusted to reduce the flow of nutrient solution to a point wherein substantially all of the inert support material remains moist, but there is no substantial drainage of nutrient solution from the column. The moistness of the inert support material can be periodically checked through apertures 20 in the column.

Since many modifications, variations and changes in detail may be made to the described embodiment, it is intended that all matter in the foregoing description and shown in the accompanying drawings be interpreted as illustrative and not in a limiting sense.

What is claimed is:

1. A system for hydroponically growing plants in a vertical array comprising:
    (a) a vertical cylindrical column adapted to contain an inert support material, the column including top and bottom openings and a plurality of side apertures;
    (b) a nutrient reservoir for positioning above the column and adapted to contain a nutrient solution;
    (c) means for controlling introduction of nutrient solution into the column and for restricting evaporation of nutrient solution through the top opening of the column, the means including: a cap having a passageway therethrough, the cap being adapted to cover the top opening of the column; an adjustable valve for controlling the rate of introduction of nutrient solution into the column, the valve being mounted on the cap by means including a hollow pipe at least a portion of which pipe is transparent, the pipe connecting the valve with the passageway in the cap, the valve being adjustable to control regularly timed drips of nutrient solution into the column, the pipe permitting unrestricted passage of nutrient solution from the valve through the passageway in the cap to permit accurate timing of the drips of nutrient solution, the pipe and the cap supporting the valve above the top opening of the column for gravity feed of nutrient solution into the column, the transparent portion of the pipe permitting visual inspection of the rate of introduction of nutrient solution from the valve into the column; and conduit means connecting the valve to the nutrient reservoir.

2. The system of claim 1 wherein the passageway in the cap is generally centrally located in the top of the cap.

3. The system of claim 1 wherein the transparent portion of the pipe comprises a window permitting visual inspection of the rate of introduction of nutrient solution into the column.

4. The system of claim 1 further including means for collecting nutrient solution draining from the column through the bottom opening of the column.

5. The system of claim 1 further including means for supporting the column in a vertical position.

6. The system of claim 5 wherein the means for supporting the column comprises a base, the base including: a vertical cylindrical rim having an inner diameter sized to complementarily fit around the outside of and mate with a bottom portion of the column; bearing means connected to the rim and protruding inwardly from a bottom of the rim for supporting the bottom portion of the column in mating position with the rim, the bearing means permitting drainage of nutrient solution therethrough from the column, and the rim and bearing means being adapted for supporting the column in a vertical position; and rim support means connected to the rim and extending outwardly therefrom, the support means adapted for supporting the cylindrical rim in a vertical position above a surface.

7. The system of claim 6 further including means for collecting nutrient solution exiting the column through the bottom opening of the column, the means for collecting the nutrient solution comprising a collection reservoir adapted to fit beneath the bottom opening of the column; wherein the rim support means include a plurality of legs extending downwardly and outwardly from the rim, the legs being adapted to support the rim above a surface, the legs providing space for the collection reservoir beneath the rim and the bearing means, and the legs permitting access to the collection reservoir without changing the position of the rim and column relative to the surface; the collection reservoir and the legs being adapted to permit removal of the collection reservoir from a position beneath the bottom opening of the column to a position outside the rim support means without changing the position of the rim and column relative to the surface.

8. The system of claim 1 further including a mesh screen covering the bottom opening of the column, the screen being adapted to prevent passage of support material outside the column through the bottom opening of the column, and the screen being further adapted to permit the passage of nutrient solution from inside the column to outside the column through the bottom opening of the column.

9. The system of claim 7 further including a mesh screen covering the bottom-opening of the column, the screen being adapted to prevent passage of support material outside the column through the bottom opening of the column, and the screen being further adapted to permit the passage of nutrient solution from inside the column to outside the column through the bottom opening of the column.

10. The system of claim 1 wherein the means for controlling the introduction of nutrient solution into the column further includes a nutrient solution dispersion baffle, the baffle comprising a serrated disc of generally impervious material, the disc having an outer perimeter sized to fit complementarily within the top opening of the column and the disc being adapted to rest over the inert support material and below the valve, the serrations being generally evenly disposed about the outer periphery of the disc, the upper surface of the disc having a raised central portion and the upper surface of the disc extending generally downwardly and outwardly from the raised central portion to the periphery of the disc, the valve being positioned to introduce nutrient solution over the raised central portion of the disc, and the upper surface of the disc and the serrations being adapted to disperse nutrient solution towards inert support material adjacent the inside surface of the column.

11. The system of claim 3 wherein the means for controlling the introduction of nutrient solution into the column further includes a nutrient solution dispersion baffle, the baffle comprising a serrated disc of generally impervious material, the disc having an outer perimeter sized to fit complementarily within the top opening of the column and the disc being adapted to rest over the inert support material and below the valve, the serrations being generally evenly disposed about the outer periphery of the disc, the upper surface of the disc having a raised central portion and the upper surface of the disc extending generally downwardly and outwardly from the raised central portion to the periphery of the disc, the valve being positioned to introduce nutrient solution over the raised central portion of the disc, and the upper surface of the disc and the serrations being adapted to disperse nutrient solution towards inert support material adjacent the inside surface of the column.

12. The system of claim 1 further including a plurality of said columns, each column including said means for controlling introduction of nutrient solution, said conduit means being connected to a single nutrient reservoir.

13. The system of claim 12 further including a common valve means connected to the nutrient reservoir and controlling flow of nutrient solution to said conduit means, the common valve means being connected to said conduit means by a distribution manifold.

14. The system of claim 1 further including a vertical plant support cage of generally cylindrical shape having a diameter substantially larger than the cylindrical column and a vertical length about equal to the vertical length of the column, the cage comprising a plurality of cross-linked members defining a plurality of apertures, the cage being adapted to be positioned outside the column and generally concentrically with the column, the cage being further adapted to support plant growth from the column and permit light to contact said plant growth.

15. The system of claim 14 wherein the apertures of the cage have diameters of from about 3 inches to about 6 inches.

16. The system of claim 6 further including a vertical plant support cage of generally cylindrical shape having a diameter substantially larger than the cylindrical column and a vertical length about equal to the vertical length of the column, the cage comprising a plurality of cross-linked members defining a plurality of apertures, the cage being adapted to be positioned outside the column and generally concentrically with the column, the cage being further adapted to support plant growth from the column and permit light to contact said plant growth.

17. The system of claim 16 further including a substantially horizontal bottom cage member connected to the bottom edge of the support cage, the bottom member comprising a plurality of cross-linked members defining a plurality of apertures, the bottom member extending from the bottom edge of the support cage inwardly to a position adjacent the cylindrical column.

18. The system of claim 15 further including a substantially horizontal bottom cage member connected to the bottom edge of the support cage, the bottom member comprising a plurality of cross-linked members defining a plurality of apertures, the bottom member extending from the bottom edge of the support cage inwardly to a position adjacent the cylindrical column.

19. The system of claim 18 wherein the apertures of the bottom cage member are substantially smaller than the apertures of the cage.

20. The system of claim 1 further including a hollow support pipe mounted within each of said side apertures, the support pipes having outer diameters sized to fit complementarily within and mate with the side apertures, the support pipes extending horizontally from a position within the cylindrical column to a position outside the column.

* * * * *